United States Patent [19]

Dones

[11] Patent Number: 4,805,988

[45] Date of Patent: Feb. 21, 1989

[54] PERSONAL VIDEO VIEWING DEVICE

[76] Inventor: Nelson Dones, 2829 Larkspur St., Yorktown, N.Y. 10598

[21] Appl. No.: 77,903

[22] Filed: Jul. 24, 1987

[51] Int. Cl.⁴ .............................................. G02B 27/22
[52] U.S. Cl. .................................... 350/137; 350/133; 353/7; 358/88
[58] Field of Search ............... 350/130, 132, 133, 137, 350/138, 145, 174, 403, 407; 353/7; 358/88, 89, 90, 91, 92

[56] References Cited

U.S. PATENT DOCUMENTS

| | | | |
|---|---|---|---|
| 2,388,170 | 10/1945 | McCollum | 358/92 |
| 3,434,772 | 3/1969 | Fogle | 350/137 |
| 3,591,251 | 7/1971 | Blankenburg | 350/137 |
| 3,670,097 | 6/1972 | Jones | 350/138 |
| 4,021,846 | 5/1977 | Roese | 350/133 |
| 4,310,849 | 1/1982 | Glass | 358/88 |
| 4,469,415 | 9/1984 | Radl | 350/133 |
| 4,560,233 | 12/1985 | Banbury | 350/174 |
| 4,561,723 | 12/1985 | Hamano et al. | 350/133 |
| 4,563,061 | 1/1986 | Ellis | 350/174 |
| 4,582,393 | 4/1986 | Shieman | 350/143 |
| 4,636,866 | 1/1987 | Hattori | 358/88 |
| 4,655,540 | 4/1987 | Wood et al. | 350/174 |
| 4,695,129 | 9/1987 | Faessen et al. | 350/133 |

*Primary Examiner*—John K. Corbin
*Assistant Examiner*—Martin Lerner
*Attorney, Agent, or Firm*—Richard L. Miller

[57] ABSTRACT

A personal video viewing device is provided which allows the simultaneous viewing of a stereoscopic external image as well as a monoscopic electronic image. This is accomplished using two optical systems which share particular components. The relative intensity of both images may be adjusted using a three-iris system where each iris may be a mechanical diaphragm, an electronically controlled liquid crystal device, or a pair of polarized discs whose relative rotational orientation controls the transmissivity of the disc pair.

13 Claims, 1 Drawing Sheet

PERSONAL VIDEO VIEWING DEVICE

BACKGROUND OF THE INVENTION

The present invention relates generally to the field of image displays and, more specifically, to image displays which permit the simultaneous viewing of both an electronic image and of the outside environment.

It is often desirable to be able to view an electronic image, such as a television picture or a computer display in a private, confidential manner. Typically this requires that the viewer be placed within the same enclosure as the imaging device, typically a cathode ray tube or a flat panel display. However, this limits both the mobility and safety of the viewer because he is unable to monitor the outside environment at the same time. With advances in very large scale integrated circuits and miniature imaging systems, it is now possible to place an entire television within an enclosure the size of a helmet or goggles. While this allows increased mobility, it endangers the wearer by cutting him off from external visual stimuli.

A.N. Stanton (U.S. Pat. No. 3,059,519) presents a headgear mounted cathode ray tube and binocular viewing device which allows for simultaneous viewing of an external image and an electronic image, however, this device does not allow the user to balance the relative light levels of the images. When the external light level falls, the external image is washed out by the electronic image. When the external light level increases, the electronic image is washed out. J. L. Jones (U.S. Pat. No. 3,670,097) provides a stereoscopic television system which provides a stereoscopic electronic image but does not provide a direct view of the external environment and is, therefore, not within the scope of the present invention.

SUMMARY OF THE INVENTION

It is, therefore, a primary object of the present invention to provide a personal video viewing system which allows a user to simultaneously view a stereoscopic image of the external world as well as a monoscopic image of an electronic imaging device.

Another object is to provide a personal video viewing system which can be worn as a headset.

A further object is to provide a personal video viewing system in which the relative intensities of the external image and the electronic image may be easily adjusted.

A still further object is to provide a personal video viewing system which is lightweight, inexpensive and comfortable to wear.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The FIGS. in the drawings are briefly described as follows.

DETAILED DESCRIPTION OF THE PREFERRED EMBODIMENTS

Figure 1:
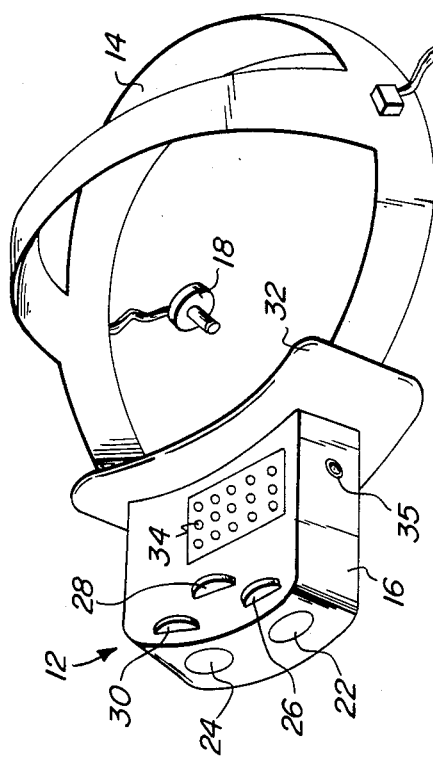
FIG. 1 is a perspective view of the instant invention.

With reference to FIG. 1, the invention may be used in the form of a headset 12, with a headband 14 which fits over and around the users head. The electronic circuitry may be miniaturized to fit inside binocular enclosure 16 and earphones 18 and 20 may be provided for listening privacy. Objective lenses 22 and 24 as well as iris adjustments 26, 28 and 30 will be explained hereunder. A shield 32 blocks out external light. If used as a television, controls and channel selectors such as 34 are provided, or an external, VCR, or cable input signal jack 35 may be used for other information.

Figure 3:
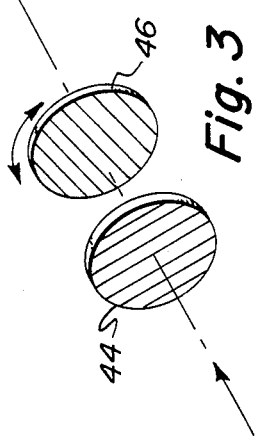
FIG. 3 is a diagrammatic perspective illustrating a polarized iris typically used in the system.
Figure 2:
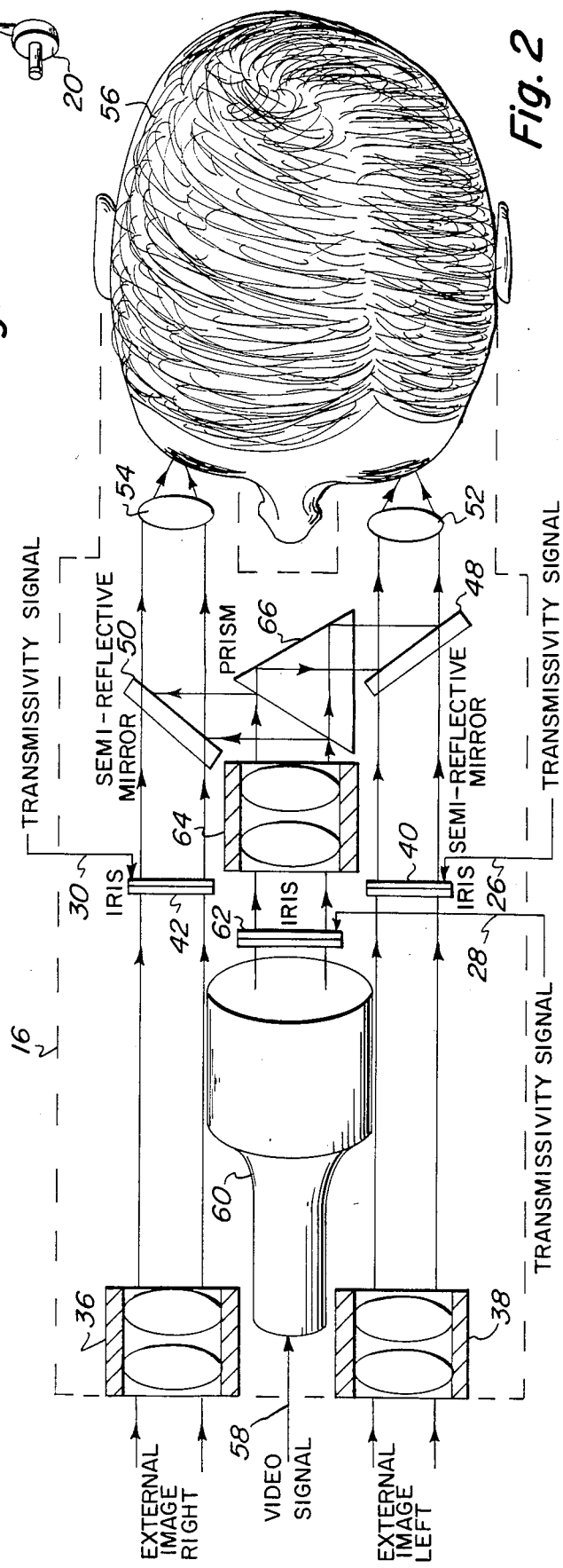
FIG. 2 is a block diagram illustrating the optics system.

The detailed operation of the optics may best be understood with reference to FIGS. 2 and 3. Light from the external source enters through both right objective lens 36 and left objective lens 38. The focused light then passes through right external image iris 40 and left external image iris 42 respectively. These irises may be mechanical diaphragms, electronically controlled liquid crystals or pairs of polarized lenses as in FIG. 3. The polarized lenses, such as 44 and 46, may be rotated with respect to one another using iris adjustments such as 26 or 30 thereby varying the transmissivity of each pair. The external image then passes through semi-reflective mirrors 48 and 50 respectively, and through viewing lenses 52 and 54 respectively producing a stereoscopic image at for viewer 56.

A video signal 58 is input to electronic imaging device 60 which may be a cathode ray tube as shown, or a flat panel display such as a light emitting diode display, a liquid crystal display, a vacuum fluorescent display, or a gas plasma display. The image passes through an electronic imaging iris 62 which may be in any of the configurations described above, passes through imaging lens 64 and is incident upon prism 66. Prism 66 splits the image into two identical ones which are incident upon semi-reflective mirrors 48 and 50 which reflect the image to viewer 56 via viewing lenses 52 and 54 respectively. By varying iris adjustments 26, 28 and 30 the relative brightness of each of the images may be adjusted.

While certain novel features of this invention have been shown and described and are pointed out in the annexed claims, it will be understood that various omissions, substitutions and changes in the forms and the details of the device illustrated and in its operation can be made by those skilled in the art without departing from the spirit of the invention.

What is claimed is:

1. A personal video viewing device comprising a stereoscopic binocular external image viewing system for viewing external images, and an electronic imaging device displaying images different from the external image, combined with a monoscopic binocular electronic image viewing system for viewing said electronic imaging device simultaneously with an external image, and means for varying the relative intensities of both said external image viewing system and said electronic image viewing system.

2. A personal video viewing device, as recited in claim 1, wherein said monoscopic viewing system comprises a beam splitting prism disposed in front of said imaging device and an imaging lens interposed between said prism and said imaging device together with two semi-reflective mirrors laterally displaced from said prism, and two viewing lenses disposed between each of said semi-reflective mirrors and the eyes of a viewer such that an image appearng upon the face of said electronic imaging device is transmitted through said imaging lens, and is then split by said prism such that identical images are transmitted via said semi-reflective mirrors and said viewing lenses into both eyes of a viewer.

3. A personal video viewing device, as recited in claim 2, wherein said stereoscopic binocular external image viewing system for viewing external images further comprises two objective lenses, one for each eye, disposed between each of said semi-reflective mirrors and an external image source such that external images are transmitted through said lenses, through said semi-reflective mirrors, and then through said viewing lenses yielding a stereoscopic external image combined with a monoscopic image of said imaging device.

4. A personal video viewing device, as recited in claim 1, wherein said electronic imaging device is a cathode ray tube.

5. A personal video viewing device, as recited in claim 1, wherein said electronic imaging device is a flat panel display.

6. A personal video viewing device, as recited in claim 5, wherein said flat panel display is a light emitting diode display.

7. A personal video viewing device, as recited in claim 5, wherein said flat panel display is a liquid crystal display.

8. A personal video viewing device, as recited in claim 1, wherein said electronic imaging device is a vacuum fluorescent display.

9. A personal video viewing device, as recited in claim 1, wherein said electronic imaging device is a gas plasma display.

10. A personal video viewing device, as recited in claim 1, wherein said means for varying the relative intensities of both said external image viewing system and said electronic image viewing system comprises two external image irises each of which is disposed between said objective lenses and said semi-reflective mirrors, and an electronic imaging iris disposed between said imaging device and said prism.

11. A personal video viewing device, as recited in claim 10, wherein each of said external image irises and said electronic image iris comprises an adjustable mechanical diaphragm.

12. A personal video viewing device, as recited in claim 10, wherein each of said external image irises and said electronic image iris comprises a pair of polarized transmissive discs wherein said discs may be rotated with respect to one another such that the intensity of light transmitted is proportional to the alignment of the axis of polarization.

13. A personal video viewing device, as recited in claim 10, wherein each of said external image irises and said electronic image iris comprises a liquid crystal whose transmissivity is responsive to an external input.

* * * * *